(12) United States Patent
Marban et al.

(10) Patent No.: US 11,287,349 B2
(45) Date of Patent: Mar. 29, 2022

(54) BURST-DUCT DETECTION SYSTEM

(71) Applicant: PTI Technologies, Inc., Oxnard, CA (US)

(72) Inventors: Joe Marban, Oxnard, CA (US); Kanwar Suri, Porter Ranch, CA (US)

(73) Assignee: PTI Technologies, Inc., Oxnard, CA (US)

( * ) Notice: Subject to any disclaimer, the term of this patent is extended or adjusted under 35 U.S.C. 154(b) by 140 days.

(21) Appl. No.: 16/888,122

(22) Filed: May 29, 2020

(65) Prior Publication Data

US 2020/0378861 A1    Dec. 3, 2020

Related U.S. Application Data

(60) Provisional application No. 62/855,576, filed on May 31, 2019.

(51) Int. Cl.
*G01M 3/00* (2006.01)
*G01M 15/09* (2006.01)
*G01M 3/28* (2006.01)

(52) U.S. Cl.
CPC ................. *G01M 3/2815* (2013.01)

(58) Field of Classification Search
CPC .......... G01M 3/00–40; G01M 3/2815
See application file for complete search history.

(56) References Cited

U.S. PATENT DOCUMENTS

| | | | |
|---|---|---|---|
| 2,673,464 A * | 3/1954 | Marcel | G01L 7/063 73/862.53 |
| 3,192,848 A | 7/1965 | Townsend | |
| 3,825,212 A | 7/1974 | Darges et al. | |
| 4,198,869 A * | 4/1980 | Mayernik | G01L 7/16 73/35.14 |
| 4,355,654 A | 10/1982 | Levesque et al. | |
| 5,092,161 A | 3/1992 | Jenkins et al. | |
| 7,536,865 B2 | 5/2009 | Mikhail | |
| 8,516,826 B2 | 8/2013 | Rostek et al. | |
| 8,708,554 B2 | 4/2014 | Thompson et al. | |
| 8,967,185 B2 | 3/2015 | Fernandes et al. | |
| 9,054,222 B2 | 6/2015 | Tham et al. | |
| 9,823,154 B2 | 11/2017 | Norris | |
| 10,054,002 B2 | 8/2018 | Foiret | |

(Continued)

FOREIGN PATENT DOCUMENTS

| | | | | |
|---|---|---|---|---|
| GB | 686887 A | * | 2/1953 | ............. G01L 7/166 |
| GB | 827870 | | 2/1960 | |

*Primary Examiner* — Nguyen Q. Ha
(74) *Attorney, Agent, or Firm* — Harness, Dickey & Pierce, P.L.C.; Anthony Fussner

(57) ABSTRACT

A burst-duct detection system is provided. The system may include a manifold; a rolling diaphragm dividing a chamber within the manifold into a top portion and a bottom portion; a high pressure chamber in fluid communication with the top portion of the manifold; an ambient pressure chamber in fluid communication with the top portion of the manifold; a piston disposed within the top portion of the manifold and operably connected to the diaphragm; a mechanical link may include a proximal end, a distal end, and a middle portion, the mechanical link being disposed within a core chamber of the manifold and the proximal end operably connected to the piston; and an indicator piston operably connected to the mechanical link.

21 Claims, 8 Drawing Sheets

(56) References Cited

U.S. PATENT DOCUMENTS

| | | |
|---|---|---|
| 10,247,639 B2 * | 4/2019 | Bhojwani ............... G01L 7/166 |
| 2018/0058973 A1 | 3/2018 | Everwyn et al. |
| 2018/0306052 A1 | 10/2018 | Lammers et al. |
| 2018/0313219 A1 | 11/2018 | Possert et al. |
| 2018/0334965 A1 | 11/2018 | Ortiz et al. |

* cited by examiner

BURST-DUCT DETECTION SYSTEM

RELATED APPLICATIONS

The present patent document takes priority from U.S. Provisional Patent Application No. 62/855,576 filed May 31, 2019, which is hereby incorporated by reference.

BACKGROUND

1. Technical Field

The present application relates to a system for detecting a burst duct and methods of detecting a burst duct event in an aircraft.

2. Background Information

A burst duct will release high pressure and high temperate air and increase pressure in aircraft nacelle causing structural damage and damage to equipment not capable of operating with these severe environments caused by the burst duct. Regulations specify that a duct rupture shall not lead to an aircraft hazardous condition.

To relieve the over pressure in a nacelle compartment consecutive to an air duct rupture, a pressure relief system may be installed. It usually consists in a latched door that is triggered open under a given pressure differential and discharging air outside the compartment. It allows reducing, first the pressure peak occurring few hundredth seconds after the burst and secondly the stabilized pressure seen in the nacelle.

It may be necessary to alleviate the over-temperatures in a compartment consecutive to a duct rupture event. In this case, a temperature detection system is implemented. Once triggered this system either commands the closure of valves associated to the air rupture source and/or sends a cockpit warning.

New devices and methods of detecting burst-duct events are needed so that failure of aircraft systems can be prevented.

BRIEF SUMMARY

A burst-duct detection system is provided. The system may include a manifold; a rolling diaphragm dividing a chamber within the manifold into a top portion and a bottom portion; a high pressure chamber in fluid communication with the top portion of the manifold; an ambient pressure chamber in fluid communication with the top portion of the manifold; a piston disposed within the top portion of the manifold and operably connected to the rolling diaphragm; a mechanical link comprising a proximal end, a distal end, and a middle portion, the mechanical link being disposed within a core chamber of the manifold and the proximal end operably connected to the piston; and an indicator piston operably connected to the mechanical link.

A method of detecting a burst-duct event in an aircraft is also provided. The method may include allowing air in an internal area of the aircraft to pass into a high pressure chamber within a manifold; passing the air from the high pressure chamber into a top portion of the manifold; urging a piston to move if the high pressure chamber has an air pressure that exceeds an ambient air pressure in an ambient air chamber and a sensing spring; and actuating a mechanical link operably connected to the piston to disengage an indicator piston.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION

Figure 1:
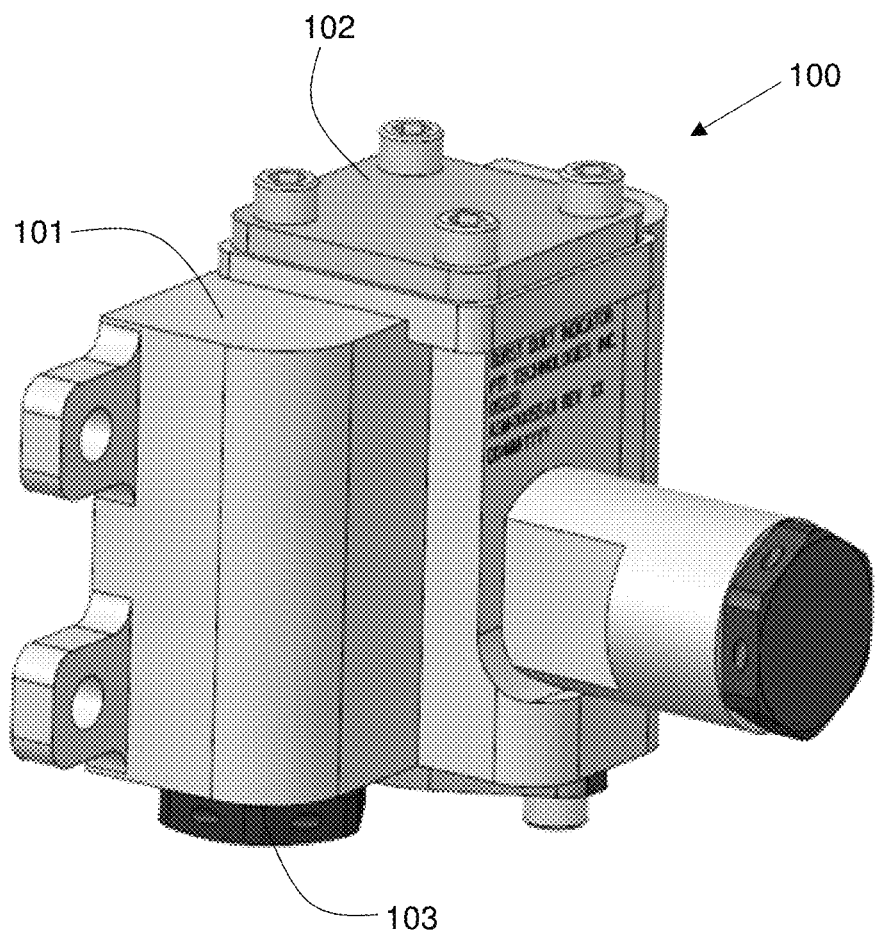
FIG. 1 illustrates an embodiment of a burst-duct detection system.

Various embodiments are described below with reference to the drawings in which like elements generally are referred to by like numerals. The relationship and functioning of the various elements of the embodiments may better be understood by reference to the following detailed description. The embodiments, however, are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

The actuation of the burst-duct detection system (BDDS) may occur when a burst duct event occurs on the aircraft engine. When this occurs, a large amount of air may enter the nacelle and cause the nacelle pressure to increase relative to the surrounding ambient pressure (outside air pressure). This increase in nacelle pressure may flow to the BDDS sensing mechanism, thus increasing the pressure on one side of the rolling diaphragm. The larger force caused by the increased pressure may overcome the sensing mechanism spring force, and the opposing ambient pressure. When this occurs the piston will move thereby moving the integrally connected mechanical link that may unlock the indicator piston. Once the indicator piston is no longer locked, the actuating spring may push the indicator piston into the airstream providing an external visual indication that alerts an aircraft mechanic that a burst duct event has occurred prompting the repair of the burst duct inside the nacelle.

Once the aircraft is on the ground, the aircraft engine will be shut down and no air will be exiting from the engine burst duct. At that point the nacelle air pressure and the ambient pressure may equalize. With equal pressure on the rolling diaphragm, the sensing spring will move the sensing mechanism to an initial position, and the mechanical link will latch onto the second locking slot on the indicator piston, locking the indicator piston in the actuated position and preventing an aircraft mechanic from resetting the indicator piston by simply pushing the indicator piston into the nacelle.

To reset the indicator piston, the aircraft mechanic will need to gain access to the indicator reset cavity covered by the reset indicator cover. Once the mechanic removes the reset indicator cover, the mechanical link can be pulled to the position, unlocking the indicator piston, the aircraft mechanic can then push the indicator piston, compressing the actuating spring, and then by simply releasing the mechanical link to lock the indicator piston in place.

FIG. 1 shows a prospective view of a burst-duct detection system 100. The system 100 may be a device that includes a manifold 101 containing the sensing components (not pictured) and air filters 103. The top plate 102 may be for covering the internal components.

The manifold 101 houses the differential pressure indicator components. The manifold 101 along with a thermal barrier or heat shield (not pictured) may also provide a controlled thermal barrier that may provide a fire barrier during a fire event, to limit damage to temperature-sensitive indicator components. The fire barrier may allow enough thermal energy to prevent exposure of indicator components to the nacelle external environment and/or to limit malfunction due to freezing water.

The construction of the manifold may be any suitable material that meets the design and performance standards required to operate in the environments encountered in aircraft devices. For example, the manifold may be made of aluminum with an anodize coating. The manifold may be designed to meet the pressure, vibration and temperature requirements of the desired environment and specific application.

The manifold design may have a contact area with the air in the nacelle external air stream. The manifold outer surface may provide a heat sink and along with insulation on the internal area, which may be exposed to high temperatures from the engine compartment, may control the internal indicator component temperatures.

Figure 2:
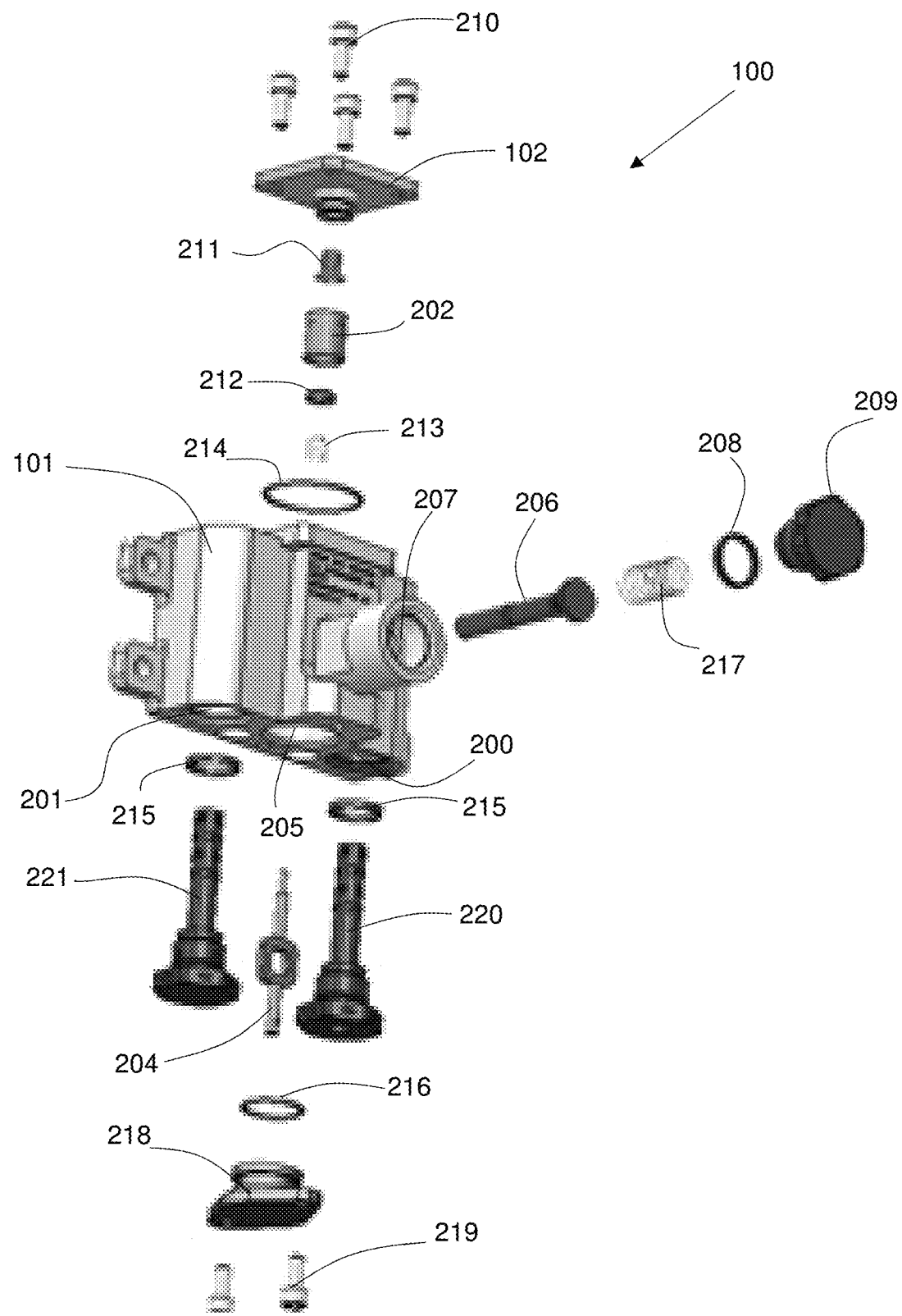
FIG. 2 illustrates an exploded view of an embodiment of a burst-duct detection system.

FIG. 2 shows an exploded view of an example of the BDDS 100. The BDDS 100 may include a manifold 101 that defines a high pressure chamber 200 and an ambient pressure chamber 201 within the manifold 101. A piston 202 may be disposed within a chamber within the manifold 101 and operably connected to a mechanical link 204. The mechanical link 204 may be disposed within indicator reset cavity 205. An indicator piston 206 is disposed within a core chamber 207 of the manifold 101.

The first filter element 220 may be disposed within the high pressure chamber 200 of the manifold 101. A second filter element 221 may be disposed within the ambient pressure chamber 201 of the manifold 101. The first filter element 220 may be a high pressure filter, and the second filter element 221 may be an ambient pressure filter. A retainer plug 211 provides guidance to the piston 202 and the diaphragm guide 212 provides guidance to rolling diaphragm. A sensing spring 213 counteracts differential pressure. An O-ring 214 provides a seal between the manifold 101 and the top plate 102. The O-ring 215 provides a seal between the manifold 101 and the filter elements 220 and 221. The O-ring 216 provides a seal between the manifold 101 and the indicator reset cover 218. The actuating spring 217 is operable connected to the indicator piston 206. Screws 219 secure the indicator reset cover 218 to the manifold 101.

Figure 3:
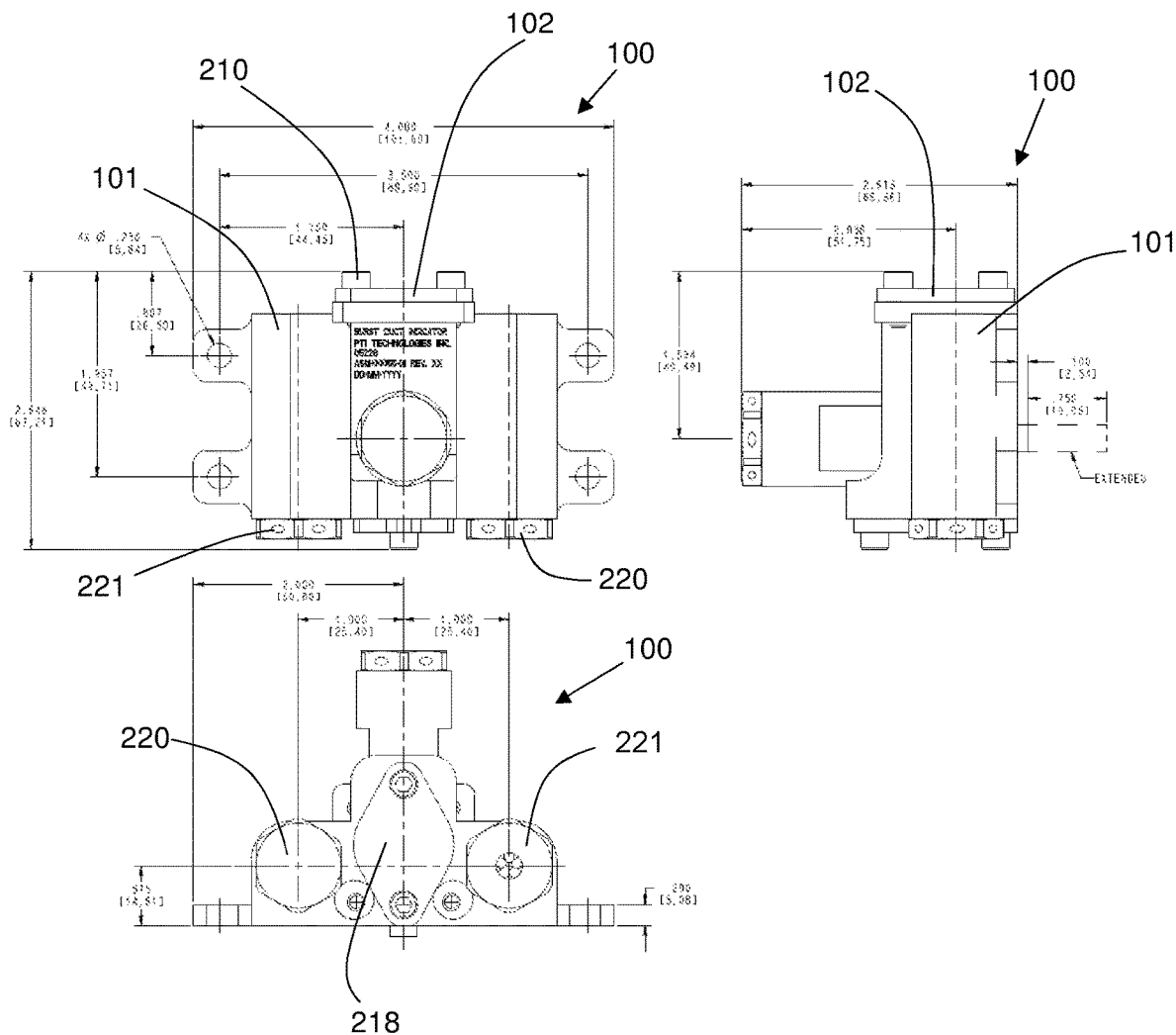
FIG. 3 illustrates several perspective views and dimensions of an example burst-duct detection system.

FIG. 3 shows several views and example dimensions of an embodiment of the BDDS 100. The dimensions provided in FIG. 3 are one of many examples and should not be construed as limiting.

Figure 4A:
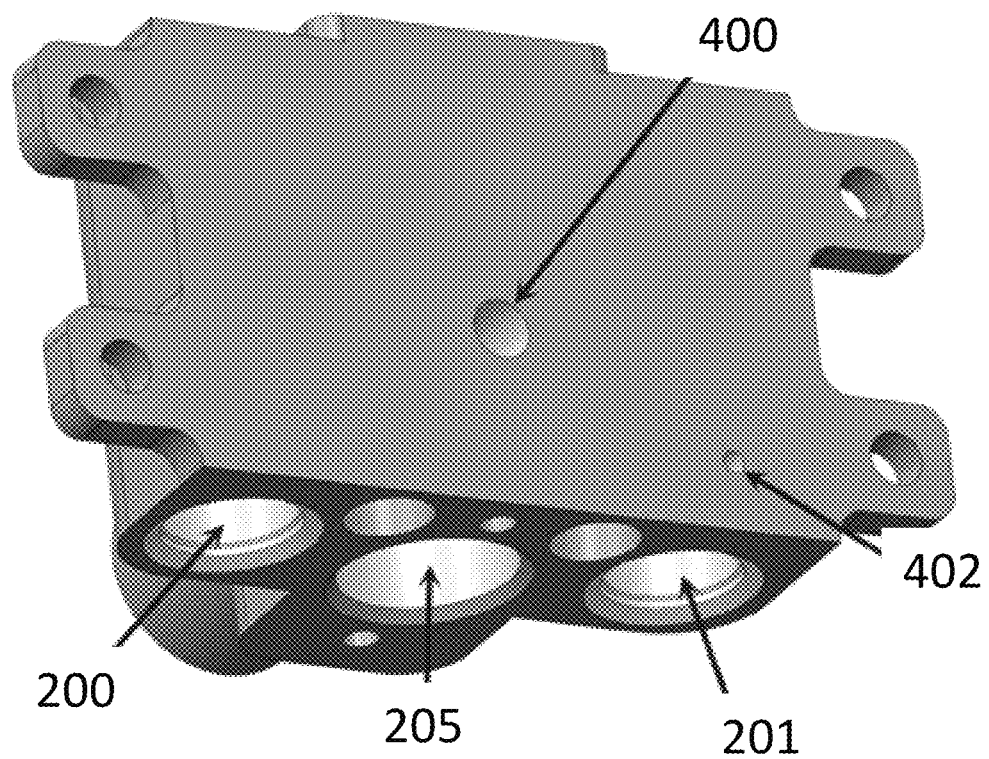
FIG. 4A illustrates a perspective view of an embodiment of a burst-duct detection system.

FIG. 4A shows a perspective view of an example of a BDDS 100. The BDDS 100 may have an indicator piston opening 400 in which the indicator piston (not pictured in FIG. 4A) is disposed. The system may have an ambient pressure opening 402 that is in fluid communication with the ambient pressure chamber 201. The ambient pressure chamber 201 is in fluid communication with ambient air. The high pressure chamber 200 may be in fluid communication with an internal area of an aircraft. In some aspects, the high pressure chamber 200 is not in fluid communication with the ambient pressure chamber 201.

Figure 4B:
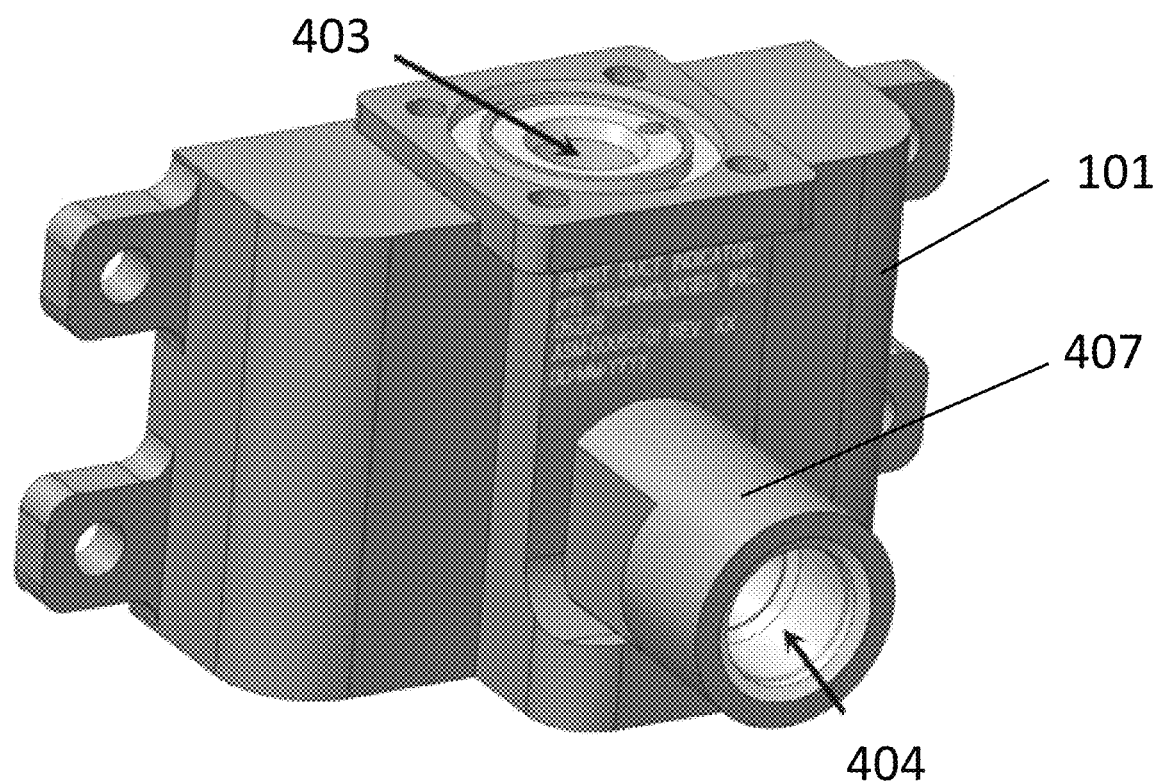
FIG. 4B illustrates a perspective view of an embodiment of a burst-duct detection system.

FIG. 4B shows a perspective view of a BDDS 100. The BDDS 100 may have a sensing mechanism cavity 403. The BDDS 100 may comprise a projection 407 that defines an indicator spring access cavity 404. The indicator spring access cavity 404 provides access to the core chamber (not pictured) of the manifold 101.

Figure 4C:
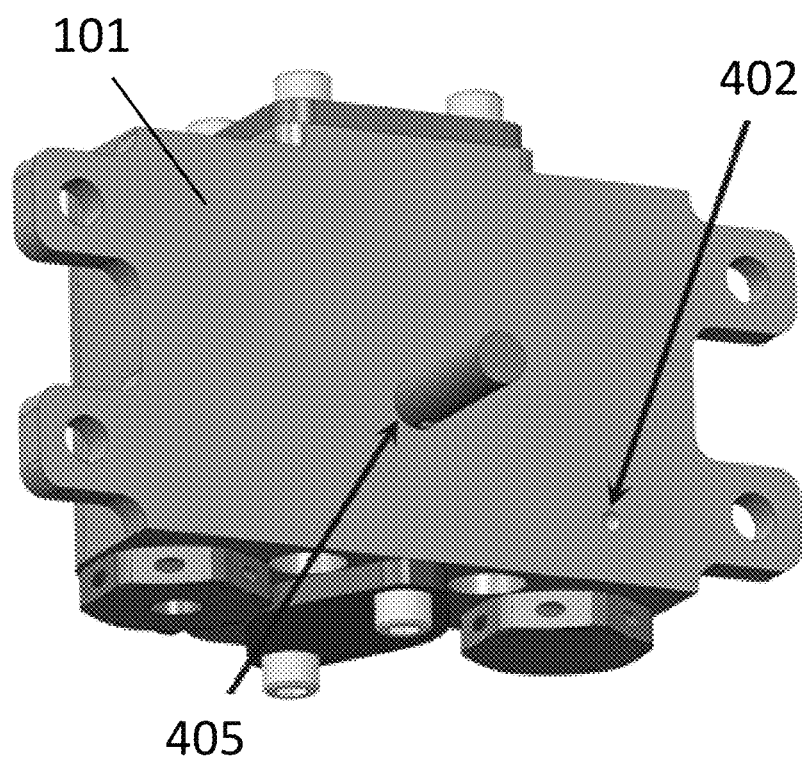
FIG. 4C illustrates a perspective view of an embodiment of a burst-duct detection system that indicates that a burst duct event has occurred.
Figure 4D:
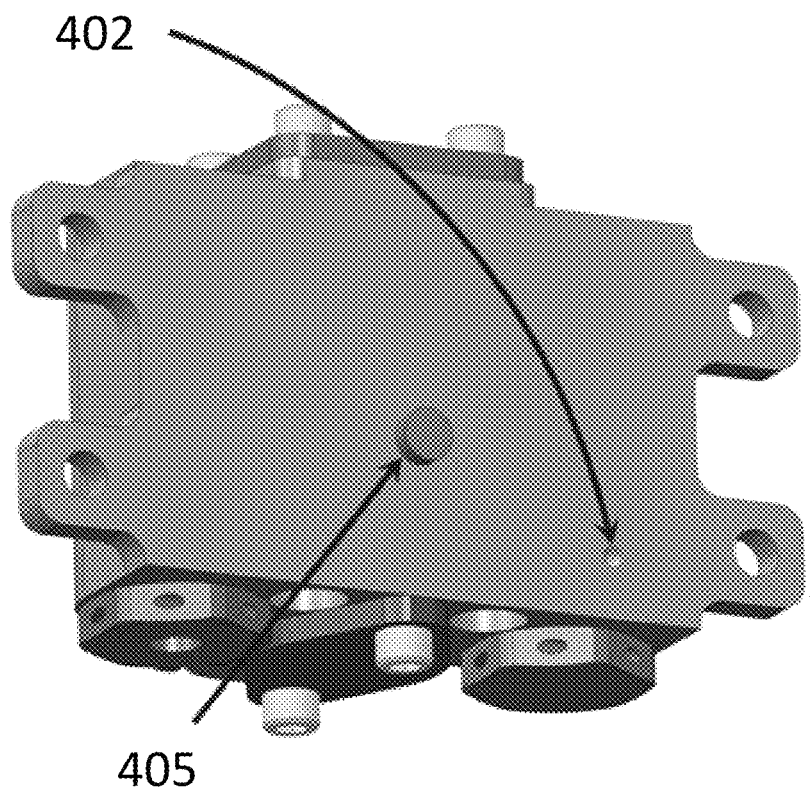
FIG. 4D illustrates a perspective view of an embodiment of a burst-duct detection system before detection of a burst-duct event.

FIG. 4C shows the BDDS 100 with the indicator piston 405 protruding from the manifold 101, indicating that a burst duct event has been detected. FIG. 4D shows the indicator piston 405 in the indicator opening 400 before a burst duct event is detected.

Figure 5A:
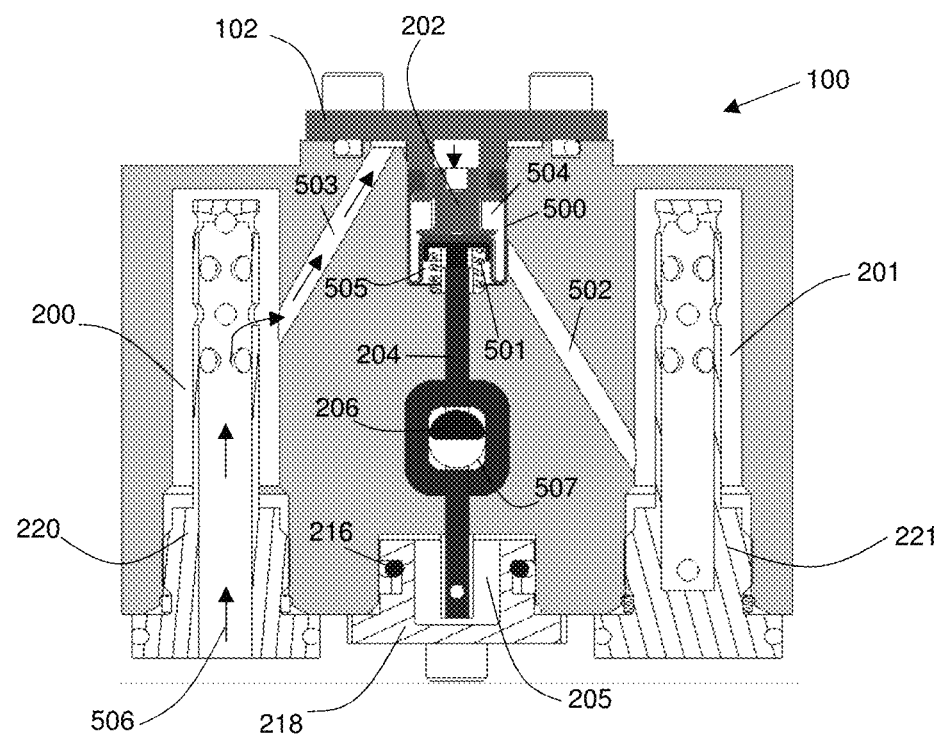
FIG. 5A shows a cross-sectional view of an example of the burst-duct detection system.
Figure 5B:
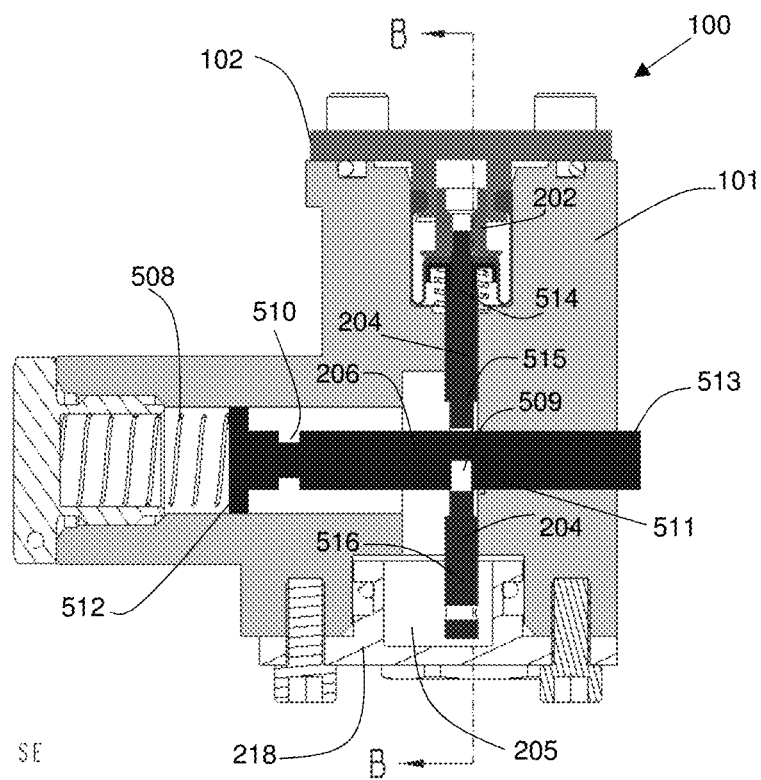
FIG. 5B shows a cross-sectional view of an example of the burst-duct detection system.

FIGS. 5A and 5B show an example of a differential pressure sensing mechanism, which includes the piston 202, rolling diaphragm 500, and sensing spring 501. The sensing spring 501 is disposed within the bottom portion 505 of the manifold 101 opposite the piston 202 and operably connected to the mechanical link 204. The mechanical link 204 may be a linear actuator, comprising a proximal end 514, a distal end 516, and a middle portion 515. The middle portion 515 may be a loop through which the indicator piston 206 passes and with which the indicator piston 206 engages.

The mechanism provides the function of sensing the differential pressure between the compartment in fluid communication with the high pressure chamber 200 and external airflow (ambient pressure). The differential pressure sensing mechanism ports air pressures from the external air stream and from inside the nacelle so that it acts as a differential pressure-sensing device. The piston 202 may be attached to a rolling diaphragm 500 that provides for low sliding friction and allows the use of static seals. The rolling diaphragm 500 may be disposed between the mechanical link 204 and the piston 202.

The piston 202 will move once the differential force exceeds the prescribed differential pressure. The spring force for the BDDS will have a relative low force versus displacement profile allowing for a relative large displacement for a given differential pressure permitting the actuation of the indicator piston via the mechanical link that will provide an indication of a burst duct event yet prevent actuation due to vibration.

FIG. 5A shows a cross-sectional view of an example of a BDDS 100. The rolling diaphragm 500 divides a chamber in the manifold 101 into a top portion 504 and a bottom portion 505. The piston 202 is disposed within the top portion 504 and is operably connected to the rolling diaphragm 500. Ambient pressure conduit 502 connects the ambient pressure chamber 201 with the top portion 504. The high pressure conduit 503 connects the high pressure chamber 200. Arrows 506 depict the flow of high pressure air through a high pressure filter 220, into the high pressure chamber 200, into the high pressure conduit 503, and into the top portion 504. Once the pressure in the top portion 504 exceeds the pressure in the ambient pressure conduit 502 and the force of the sensing spring 501, the piston 202 actuates the mechanical link 204. The mechanical link 204 is operably connected to the indicator piston 206 in the core chamber 507 of the manifold 101. FIG. 5A shows the mechanical link 204 half-way through actuation. The mechanical link 204 disengages with the indicator piston 206, thereby allowing the indicator piston 206 to exit the manifold 101 at least partially.

FIG. 5B shows a cross-sectional view of an example of a BDDS 100 half-way through actuation. Once the mechanical link 204 disengages the indicator piston 206, an actuating spring 508 that is operable connected to a distal end 512 of the indicator piston 206 moves the indicator piston 206 such that a proximal end 513 of the indicator piston 206 protrudes from the manifold 101. The indicator piston 206 may have a first locking slot 509 that engages the mechanical link 204. The indicator piston 206 may have a second locking slot 510 that can engage the mechanical link 204 after the first locking slot 509 disengages the mechanical link 204 and the high pressure chamber 200 and the ambient pressure chamber 201 have about equal pressure.

FIG. 5B also shows that the first locking slot 509 comprises a dimension 511 that is selected (predetermined) such that the mechanical link 204 does not disengage the indicator piston 206 in the absence of a burst-duct event. In some aspects, the first locking slot has a depth of about 2.4 mm to about 3.18 mm.

Once the aircraft returns to ground and the engine is shut off, the pressure equalizes between the core chamber 507 and external air, thereby actuating the mechanical link to revert back to its normal position and lock the indicator piston in place by engaging with the second locking slot.

To reset the BDDS, to get access to the mechanical link 204, the cover 102 may be removed and access is then available to the mechanical link 204, which can then be reset using basic hand tools. The system design prevents manually resetting the indicator piston by simply pushing the indicator piston back into the manifold 101. The BDDS allows for the resetting of the indicator with no special tooling by accessing the indicator piston through the indicator reset cavity.

Filters 220 and 221 limit the contaminants seen by the sensing components of the BDDS. The filters 220 and 221 provide a barrier for contaminants from fouling the differential pressure sensing mechanism and the indicator piston mechanism. Contamination of different sizes can have an order of magnitude increase in the friction forces of sliding surfaces contained in the system, thereby negatively impacting the sensitivity of the indicator actuation.

In some aspects, the filters 220 and 221 may include a stainless steel screen.

In some aspects, the ambient pressure chamber 201 may be in fluid communication with the core chamber 507 inside the manifold 101. In some aspects, the core chamber 507 has two openings to the external air stream. The first opening houses the indicator piston 206. The indicator opening 400 has a metal to metal poppet seal creating a barrier and blocking contaminants from entering the indicator housing. The second opening passes external air through the ambient pressure filter (second filter element 221) to the core chamber 507. The core chamber 507 may be pressure balanced by having pressure in the airstream and inside the BDDS housing. Having a pressure balance eliminates the impact of ambient air pressure variation at different altitudes causing variable loads on the indicator piston 206.

In some aspects, the system comprises a metal to metal seal between the manifold 101 and the indicator piston 206 where the indicator piston 206 extends into the airstream. Advantageously, a metal to metal seal is not as affected by temperature and contaminants as an elastomeric seal. Also, there will be a fixed resistance force between the indicator piston 206 and manifold 101.

In some aspects, the distal end of the indicator piston 206 may comprise a protrusion that extends perpendicular to a longitudinal direction of the indicator piston 206. This protrusion may prevent the indicator piston from ejecting from the manifold 101 when the mechanical link disengages the first locking slot as a burst-duct event is detected.

A burst-duct event in an aircraft may be detected using the system and methods disclosed herein. A method of detecting a burst-duct event may include allowing air in an internal area of the aircraft to pass into a high pressure chamber within a manifold. The air entering the high pressure chamber may be passed through a filter and into a top portion of the manifold. As the pressure differential increases a piston moves, thereby actuating a mechanical link operably connected to the piston to disengage an indicator piston.

The method may include moving the indicator piston to a position where a portion of the indicator piston protrudes from the manifold once the mechanical link disengages a first locking slot on the indicator piston. In some aspects, the method may include engaging the mechanical link with a second slot on the indicator piston when the high pressure chamber and the ambient pressure chamber have about equal pressure.

In some aspects, the operating pressure of the system may be from about 17.2 kPa (2.5 psig) to about 137.9 kPa (20 psig). In some aspects, a burst pressure may be about 34.5 kPa (5 psig). In some aspects, the BDDS actuation pressure may be about 20.7 kPa (3 psig).

The materials of the system may be selected so that the system may operate at temperatures of about −54° C. to 400° C.

All of the systems and methods disclosed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

We claim:

1. A burst-duct detection system, comprising:
    a manifold;
    a rolling diaphragm dividing a chamber within the manifold into a top portion and a bottom portion;
    a high pressure chamber in fluid communication with the top portion of the manifold;
    an ambient pressure chamber in fluid communication with the bottom portion of the manifold;
    a piston disposed within the top portion of the manifold and operably connected to the rolling diaphragm;
    a mechanical link comprising a proximal end, a distal end, and a middle portion, the mechanical link being disposed within a core chamber of the manifold and the proximal end operably connected to the piston; and
    an indicator piston operably connected to the mechanical link.

2. The burst-duct detection system of claim 1, further comprising a first filter element disposed within the high pressure chamber of the manifold.

3. The burst-duct detection system of claim 1, further comprising a second filter element disposed within the ambient pressure chamber of the manifold.

4. The burst-duct detection system of claim 1, further comprising a sensing spring within the bottom portion of the manifold opposite the piston and operably connected to the mechanical link.

5. The burst-duct detection system of claim 1, wherein the indicator piston comprises a first locking slot that engages the mechanical link.

6. The burst-duct detection system of claim 5, wherein the first locking slot has a depth of about 2.4 mm to about 3.18 mm.

7. The burst-duct detection system of claim 5, wherein the indicator piston comprises a second locking slot that can engage the mechanical link after the first locking slot disengages the mechanical link and wherein the high pressure chamber and the ambient pressure chamber have about equal pressure.

8. The burst-duct detection system of claim 5, wherein the indicator piston comprises a proximal end and a distal end, the distal end operably connected to an actuating spring that moves the indicator piston to protrude from the manifold when the first locking slot is disengaged.

9. The burst-duct detection system of claim 8, wherein the distal end of the indicator piston comprises a protrusion that extends perpendicular to a longitudinal direction of the indicator piston.

10. The burst-duct detection system of claim 1, wherein the mechanical link is a linear actuator, wherein the middle portion is a loop through which the indicator piston passes and with which the indicator piston engages.

11. The burst-duct detection system of claim 1, further comprising a metal to metal seal between the indicator piston and the manifold.

12. The burst-duct detection system of claim 1, wherein the high pressure chamber is in fluid communication with an internal area of an aircraft.

13. The burst-duct detection system of claim 1, wherein the ambient pressure chamber is in fluid communication with ambient air.

14. The burst-duct detection system of claim 1, wherein the high pressure chamber is not in fluid communication with the ambient pressure chamber.

15. The burst-duct detection system of claim 1, wherein the rolling diaphragm is disposed between the mechanical link and the piston.

16. The burst-duct detection system of claim 1, further comprising a heat shield disposed on an outside of the manifold.

17. A method of detecting a burst-duct event in an aircraft, comprising:
    allowing air in an internal area of the aircraft to pass into a high pressure chamber within a manifold;
    passing the air from the high pressure chamber into a top portion of the manifold;
    urging a piston to move if the high pressure chamber has an air pressure that exceeds an ambient air pressure in an ambient air chamber and a sensing spring; and
    actuating a mechanical link operably connected to the piston to disengage an indicator piston.

18. The method of claim 17, wherein the air that passes into the high pressure chamber does not pass into a core chamber within the manifold.

19. The method of claim 17, further comprising filtering the air that passes into the high pressure chamber.

20. The method of claim 17, further comprising moving the indicator piston to a position where a portion of the indicator piston protrudes from the manifold once the mechanical link disengages a first locking slot on the indicator piston.

21. The method of claim 20, further comprising engaging the mechanical link with a second slot on the indicator piston when the high pressure chamber and the ambient air chamber have about equal pressure.

* * * * *